United States Patent
Bakir et al.

(10) Patent No.: US 12,392,598 B2
(45) Date of Patent: Aug. 19, 2025

(54) SYSTEM FOR MEASURING A THICKNESS OF A LAYER COATED ON A BODY

(71) Applicant: TUSAS—TURK HAVACILIK VE UZAY SANAYII ANONIM SIRKETI, Ankara (TR)

(72) Inventors: Mete Bakir, Ankara (TR); Abdullah Gozum, Ankara (TR); Elif Gaye Erki, Ankara (TR); Oguzhan Akgol, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 161 days.

(21) Appl. No.: 18/207,916

(22) Filed: Jun. 9, 2023

(65) Prior Publication Data

US 2024/0003669 A1  Jan. 4, 2024

(30) Foreign Application Priority Data

Jun. 30, 2022  (TR) ............................... 2022/010876

(51) Int. Cl.
   *G01B 7/06*  (2006.01)
(52) U.S. Cl.
   CPC ..................................... *G01B 7/06* (2013.01)
(58) Field of Classification Search
   CPC .. G01R 27/2694; G01R 29/10; G01R 33/032; G01R 33/0354; G01R 33/26; G01R 33/0094; G01R 29/0878; G01R 33/028; G01R 15/148; G01R 29/08; G01R 33/345; G01R 29/0814; G01B 15/02; G01B 7/105; G01B 15/025; G01B 7/06; G01B 2210/56; G01B 15/00; G01F 23/284; G01F 23/2845; G01F 23/802; C09D 5/32; C09D 1/00; G01N 2021/558; G01N 21/55; G01N 21/59
   See application file for complete search history.

(56) References Cited

U.S. PATENT DOCUMENTS

| | | | | |
|---|---|---|---|---|
| 6,005,397 A * | 12/1999 | Zoughi | .................. | G01N 22/02 324/646 |
| 6,359,446 B1 * | 3/2002 | Little, Jr. | ............... | G01N 22/00 324/637 |
| 6,815,947 B2 * | 11/2004 | Scheiner | ................ | G01B 7/105 324/229 |
| 7,248,042 B2 * | 7/2007 | Hachtel | .................. | G01B 7/105 324/202 |
| 7,262,596 B2 * | 8/2007 | Hachtel | .................. | G01B 7/105 324/202 |
| 7,339,382 B1 * | 3/2008 | Bray | ...................... | G01B 15/02 324/637 |
| 7,898,265 B2 | 3/2011 | Takeuchi et al. | | |
| 9,304,046 B2 * | 4/2016 | Van Mechelen | ... | G01B 11/0683 |

* cited by examiner

*Primary Examiner* — Vinh P Nguyen
(74) *Attorney, Agent, or Firm* — Notaro, Michalos & Zaccaria P.C.

(57) ABSTRACT

A thickness measurement system has a body; at least one layer coated on the body to improve physical properties and/or provide protection against external factors; a sensor that enables the measurement of the layer thickness by transmitting and/or reflecting electromagnetic signals; a processor unit that processes the data received from the sensor to calculate the layer thickness value.

12 Claims, 3 Drawing Sheets

SYSTEM FOR MEASURING A THICKNESS OF A LAYER COATED ON A BODY

FIELD

The present invention relates to a thickness measurement system that enables the measurement of paint and/or coating thickness applied to surfaces.

BACKGROUND

Various painting and coating processes are carried out in order to absorb infrared and RF signals in air and/or space vehicles, to provide invisibility against thermal cameras and radar systems and/or to protect parts from the abrasive effects of the external environment. In the known-state of the art, magnetic inductive, vortex or ultrasonic measuring devices operating by contacting the surface are used to measure the paint thickness applied to the parts, which takes quite a long time since a certain period of time is required for the paint to dry. In addition, although there are some methods that provide contactless measurement, they are neither practical nor sufficient in terms of precision and measurement speed.

Metamaterials are suitable for use in sensor applications because they can be designed to exhibit more extraordinary electromagnetic properties than materials found in nature and in periodic nature. The most widely known and used metamaterial structures include the split-rings produced in rectangular and circular geometry. Sensor structures produced using metamaterials are among the mostly studied subjects due to the fast and precise results.

According to U.S. Pat. No. 7,898,265, which is included in the known-state of the art, properties of transmitting and reflecting rays to the surface by means of microwave source are detected by sensors. In this way, paint thickness applied to the surface can be measured.

SUMMARY

A thickness measurement system according to the present invention provides a more practical and reliable measurement of the paint or layer thickness on the surface.

Another object of the present invention is to measure a coating thickness value, that is applied on a structure made of different materials, by a more sensitive and efficient system.

A further object of the present invention is to realize a measurement system that detects thickness value of the paint applied on the air vehicle more safely and quickly.

The thickness measurement system realized to achieve the object of the invention, which is defined in the first claim and other claims dependent thereon, comprises a body that can be a land, air and/or space vehicle; a layer which is coated on the body to provide invisibility against radars and thermal cameras and/or assist to protect the body from natural effects such as humidity, temperature, lightning and ballistic effects. Material of the body may be a metallic material, as well as a rubber, plastic, polymer and composite material. Using the principles of transmitting electrical or magnetic signals transmitted and/or received over the sensor and/or reflecting the signal on the body, the thickness measurement system allows the measurement depending on the relationship between the layer thickness coated on the body and the electromagnetic permeability coefficient of the body. Data received by the sensor is interpreted by a processor unit and expressed in terms of a desired thickness parameter.

The thickness measurement system according to the invention comprises a sensor which consists of a plurality of metamaterial cells arranged in a split-ring structure, and which is moved towards the body so as not to contact the body, so that the layer thickness is measured. On the sensor, in order of proximity to the body, there are metamaterial cells and a microstrip structure consisting of a metallic material and triggering the metamaterial cells by transmitting a signal. There is a plurality of ports on both sides of the microstrip structure on the sensor, which allow signal transfer therebetween. A signal is sent to the sensor via a first port, which is then transmitted to a second port. Due to the interaction between the body and the sensor when the sensor is brought close enough to the body with a predetermined distance therebetween, the amplitude and energy (E) of the signal transmitted between the ports exhibit a parabolic decrease at a certain frequency value to take a minimum value thereof. The sensor performs the process of detecting the frequency value at which the transmitted signal energy change is maximum, and the process of matching the frequency value with a layer thickness value predetermined by the user. Thus, it is ensured that the layer thickness value on the body is determined in a contactless manner.

In an embodiment of the invention, the thickness measurement system comprises a microstrip structure in the sensor, which provides signal transport between the ports provided at its two ends; a first port for sending a signal onto the microstrip structure via the signal source, and a second port for receiving the signal transmitted over the microstrip structure through the first port. A processor unit determines the layer thickness value corresponding to the frequency value at which the energy (E) change of the signal transmitted through the microstrip structure between the first port and the second port is maximum. The processor unit provides the simultaneous determination of the layer thickness by performing the matching process of the measured frequency with the layer thickness values corresponding to the frequencies predetermined by the user and stored in the memory unit.

In an embodiment of the invention, the thickness measurement system comprises a coating device for applying a layer on the body. The sensor is placed on the coating device and instantly measures the layer thickness value applied to each region on the body by measuring it immediately after the layer application process.

In an embodiment of the invention, the thickness measurement system comprises a solid model created by the processor when the shape and dimensions of the body are input; the coating device that provides a layer coating on an outer surface of the body by following the body shape on the solid model. The sensor is located on the part provided on the coating device to apply the coating, and acts in connection with the coating device, thereby enabling the measurement of the layer thickness applied on the body during the coating process at the time of application. Thus, the layer thickness values measured by the sensor can be displayed on the solid model simultaneously by the processor.

In an embodiment of the invention, the thickness measurement system comprises a plurality of response frequency ranges (TF), which are varied to include different frequency values according to the material type the body and layer are made of, and include the frequency values predetermined by the user and stored in the memory for each material type. Using the processor unit, the related data is selected from the data set stored, and the response frequency range (TF) of sensor is determined in accordance with the material type. In this way, the sensor can focus on the selected frequency range for layer thickness detection.

In an embodiment of the invention, the thickness measurement system comprises a plurality of measurement frequency data indicating the layer thickness, which are predetermined by the user within each response frequency range (TF), and input to the system to be stored in the memory unit. Thanks to the algorithm in the processor unit, frequency value instantly detected by the sensor and the measurement frequency values stored in the memory unit are matched to calculate the layer thickness.

In an embodiment of the invention, the thickness measurement system compares the measurement frequency and the frequency values determined by the sensor instantly, by means of the algorithm. As a result of this comparison, if the frequency value instantly determined by the sensor does not match any layer thickness value among the previously stored data, the layer thickness is calculated by performing an interpolation process by the software of the processing unit.

In an embodiment of the invention, in the thickness measurement system, the metamaterial cells on the sensor are triggered by a signal via a linearly extending microstrip line just below it. In the sensor structure, there are metamaterial cells in a number determined by the user, which are in a split-ring resonator structure, located between the microstrip line and the body during measurement, and can be produced in different geometric structures such as circular, rectangular, hexagonal.

In an embodiment of the invention, the thickness measurement system comprises a sensor which is covered with a layer so that there is a 1-millimeter gap between the layer and the sensor, wherein inductance and capacitance values of the sensor, which occur in the equivalent circuit representation when approached to the body, vary. As a result of its interaction with the surface, amplitude of the transmitted signal between the first port and the second port and accordingly the signal energy (E) value decreases, and the frequency value at which this occurs increases in direct proportion with the increase in the layer thickness. As the layer thickness increases, measurement frequency value corresponding to this thickness increases, as well.

In an embodiment of the invention, the thickness measurement system comprises a processor unit that uses the S21 scattering parameter, which is the graphical expression of the signal transmitted between the first port and the second port, to detect the frequency value in which the amplitude value of the transmitted signal is minimum, the resonators show reactive behavior and the amplitude of the signal decreases.

In an embodiment of the invention, the thickness measurement system comprises a processor unit with an artificial intelligence algorithm. The artificial neural network is trained by machine learning methods by inputting different layer thickness and measurement frequency values depending on the materials predetermined by the manufacturer for the body and layer. Artificial neural networks use the input data to determine the relationship between the frequency value measured by the sensor and the layer thickness value. In this way, the thickness measurement system can be suitable for varying body/layer material types and thicknesses.

In an embodiment of the invention, the thickness measurement system comprises an input unit that allows the user to select a material of the body and layer; an output unit that allows the layer thickness value to be displayed to the user. When the material type is selected using the input unit, the measurement frequency data stored in the memory unit, which is suitable for the material preferred by the user, is used via the software of the processor unit. The frequency value determined by the sensor is processed using the stored data, so that the layer thickness is determined and the determined thickness value is displayed to the user via the output unit.

In an embodiment of the invention, the thickness measurement system comprises a distance measuring device for measuring a distance between the body and the sensor. The ideal value of the distance between the body and the sensor is predetermined and stored in the memory unit. By using a distance measuring device, the distance between the body and the sensor is instantly measured and compared with the predetermined value. The process of keeping the distance between the body and the sensor constant at the value predetermined by the user, which provides an alert when the measured distance value differs from the value predetermined by the user and enables the sensor to be activated to adjust the distance to the desired value, is carried out with the commands provided by the processor unit.

In an embodiment of the invention, the thickness measurement system comprises a plurality of metamaterial cells periodically placed on the sensor. The plurality of metamaterial cells in the same geometry are arranged side by side to form the sensor structure.

In an embodiment of the invention, the thickness measurement system comprises the metamaterial cell the dimensions of which can be changed to change the operating frequency value, so that the measurement sensitivity thereof can be adjusted. In this way, the thickness measurement system can be adjusted to operate in different frequency ranges.

BRIEF DESCRIPTION OF THE DRAWINGS

The thickness measurement system realized to achieve the object of the present invention is illustrated in the attached drawings, in which.

Figure 1:
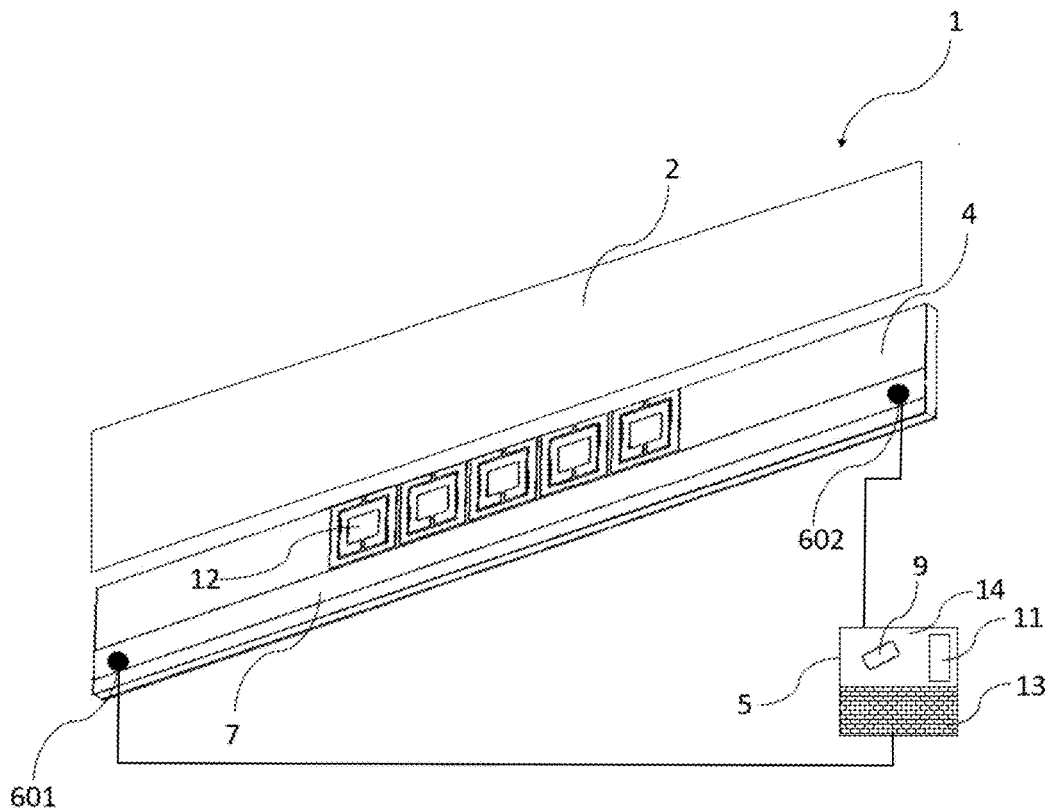
FIG. 1 is a perspective view of the thickness measurement system.

All the parts illustrated in figures are individually assigned a reference numeral and the corresponding terms of these numbers are listed below:

1. Thickness Measurement System
2. Body
3. Layer
4. Sensor
5. Processor Unit
6. Port
   601. First port
   602. Second port
7. Microstrip structure
8. Coating device
9. Solid model
10. Measurement frequency
11. Memory unit 12. Metamaterial cell
13. Input unit
14. Output unit
15. Distance measuring device
(E) Signal energy

DETAILED DESCRIPTION

The thickness measurement system (1) comprises a body (2); at least one layer (3) coated on the body (2) to improve physical properties and/or provide protection against external factors; a sensor (4) that enables the measurement of the layer (3) thickness by transmitting and/or reflecting electromagnetic signals; a processor unit (5) that processes the data received from the sensor (4) to calculate the layer (3) thickness value (FIG. 1).

Figure 2:
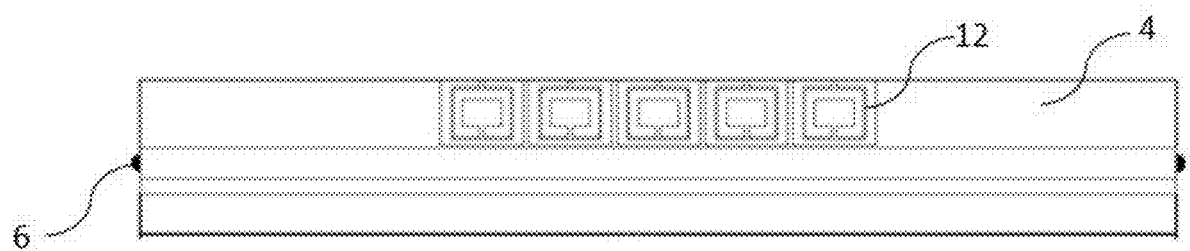
FIG. 2 is a schematic view of the sensor.

The thickness measurement system (1) according to the invention comprises the sensor (4) in a metamaterial-based split-ring structure, which is located to have a distance to the body (2); a plurality of ports (6) on the sensor (4) that allow signal transfer therebetween; a processor unit (5) which enables detection of the frequency value at which the signal energy (E) transmitted between the ports (6) is minimum, so as to match it with the layer (3) thickness value, thus enabling the layer (3) thickness value on the body (2) to be determined in a contactless manner (FIG. 2).

The thickness measurement system (1) comprises a body (2) made of a metal, rubber, plastic or composite material; a layer (3) coated on the body (2) to provide RF (infrared) invisibility and/or to protect the body (2) against natural factors such as humidity, temperature, lightning, and ballistic effects. Using the signals transmitted and/or received through the microstrip structure (7) located under the metamaterial cells (12) on the sensor (4), the thickness of the layer (3) coated on the body (2) is determined in relation to the electromagnetic permeability coefficient of the body (2) and the layer (3). The data received by the sensor (4) is processed by a processor unit (5).

There is a plurality of metamaterial cells (12) arranged sequentially in a-split ring structure, which can be produced in the form of a square or rectangle in the structure of the sensor (4). The sensor (4) is moved towards to the body (2), preventing its contact with the body (2), so that the thickness of the layer (3) is measured. There is a plurality of ports (6) on both sides of the microstrip structure (7) on the sensor (4) that allow signal transfer therebetween. A signal is sent to the sensor (4) using the first port (601), which is then transmitted to the second port (602). When the sensor (4) is moved towards the layer (3) with approximately 1 mm between the sensor (4) and the body (2), the frequency value at which the change in the amplitude of the signal transmitted between the ports (601-602) and the signal energy (E) is maximum, is determined, and the frequency value obtained is converted to the layer (3) thickness value by the processor unit (5) by using the measurement frequency (10) data pre-stored in the memory unit (11).

Figure 3:
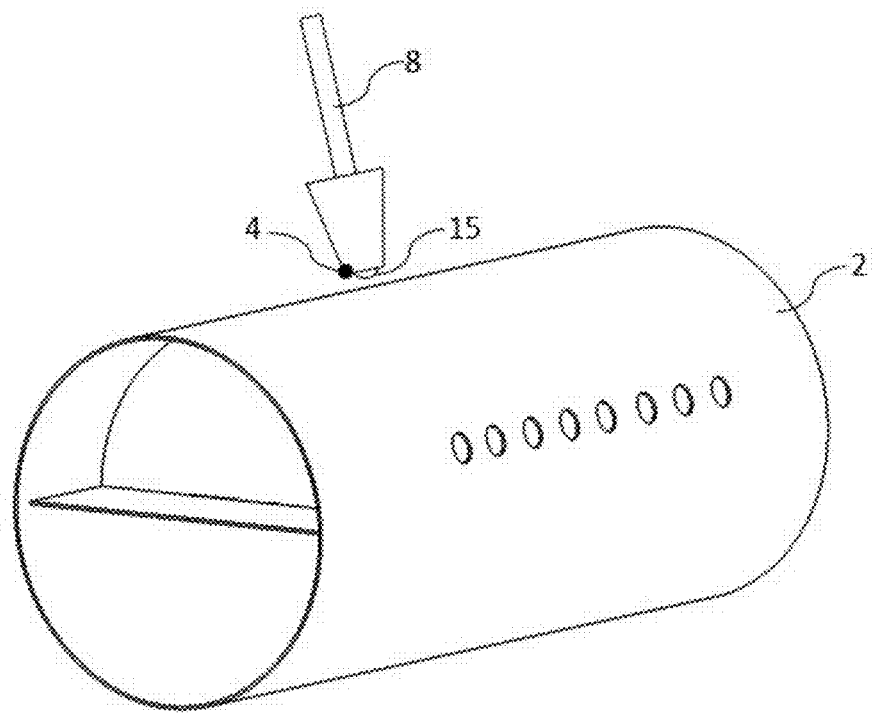
FIG. 3 is a schematic view of the coating device and the body.

In an embodiment of the invention, the thickness measurement system (1) comprises a microstrip structure (7) on the sensor (4), which provides signal transfer between the ports (6); a first port (601) that allows a signal to be sent on the microstrip structure (7); a second port (602) for receiving the signal sent from the first port (601) and transmitted over the microstrip structure (7); a processor unit (5) connected with the first port (601) and the second port (602), which matches the layer (3) thickness values predetermined by the user with the frequency value at which the signal energy (E) change transmitted between the ports (6) is maximum, thereby enabling the layer (3) thickness to be determined simultaneously. By means of the processor unit (5), the layer (3) thickness value corresponding to the frequency value at which the energy (E) change of the signal transferred between the first port (601) and the second port (602) is maximum can be determined (FIG. 3).

Figure 4:
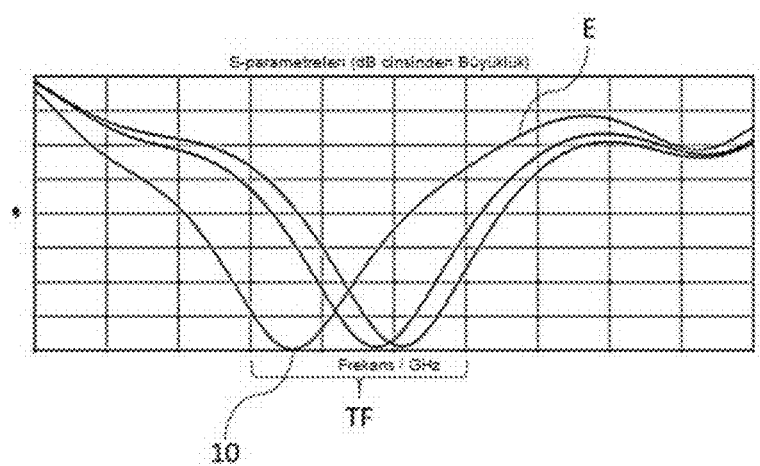
FIG. 4 is a graphical representation of the signal energy (E) change transmitted between the ports, and the brake levels by frequency.

In an embodiment of the invention, the thickness measurement system (1) comprises a coating device (8) for applying a layer (3) on the body (2); the sensor (4) on the coating device (8), which allows the thickness of the layer (3) applied on the body (2) to be measured simultaneously with the coating process. The sensor (4) is actuated in conjunction with the coating device (8) to scan the surface following the coating device (8). Thanks to the sensor (4) that is moved on the body (2) immediately after the layer (3) coating process, the layer (3) thickness is determined simultaneously with the application of layer (3) (FIG. 4).

In an embodiment of the invention, the thickness measurement system (1) comprises a solid model (9) created by modeling the body (2) in a computer environment; the sensor (4) located on the coating device (8) and operating in conjunction with the coating device (8), thus enabling the instant measurement of the layer (3) thickness applied on the body (2) during the coating process; and the processor unit (5) that allows the measured layer (3) thickness to be displayed simultaneously on the solid model (9). The sensor (4) operates together with the coating device (8) and scans the surface of the body (2), so that the layer (3) thickness value is displayed by mapping on the solid model (9).

In an embodiment of the invention, the thickness measurement system (1) comprises a plurality of response frequency ranges (TF) which vary according to the type of material from which each body (2) and each layer (3) is manufactured, and which include frequency values predetermined by the user for different material types; the processor unit (5) that allows the selection of the response frequency range (TF) of sensor (4) according to the material type. A plurality of measurement frequency (10) values are included in the response frequency range (TF) for different material types. Therefore, response frequency range (TF) of the sensor (4) is selected in accordance with the material type, so that the sensor (4) is focused on the predetermined response frequency range (TF) for the detection of layer (3) thickness.

In an embodiment of the invention, the thickness measurement system (1) comprises a plurality of measurement frequencies (10) within the response frequency range (TF) corresponding to the layer (3) thickness values predetermined by the user; a memory unit (11) in which the measurement frequency (10) values are stored; the processor unit (5) with an algorithm for the calculation of the layer (3) thickness by matching the frequency value detected by the sensor (4) with the measurement frequency (10) values in the memory unit (11). The measurement frequency (10) values in the data set pre-stored in the memory unit (11) are matched with the frequency values measured instantaneously by the sensor (4). Thus, the thickness of the layer (3) can be determined for different types of materials pre-stored in the memory unit (11).

In an embodiment of the invention, the thickness measurement system (1) comprises the processor unit (5) with an algorithm for the calculation of the layer (3) thickness by performing an interpolation process, in case the frequency value detected by the sensor (4) does not exactly match the layer (3) thickness values stored in the memory unit (11). Thus, the layer (3) thickness value can be calculated for all frequency values among the measurement frequency (10) values stored in the memory unit (11).

Figure 5:
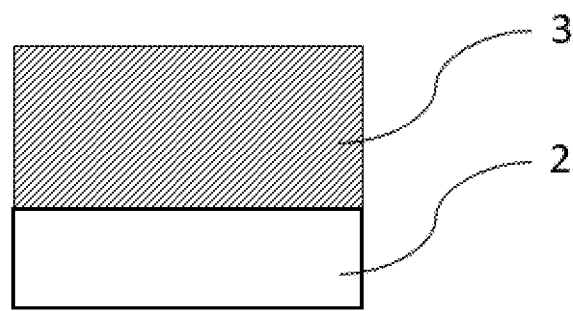
FIG. 5 is a schematic view of the body and the layer.

In an embodiment of the invention, the thickness measurement system (1) comprises a plurality of metamaterial cells (12) in a split-ring resonator structure between the microstrip structure (7) and the body (2), which are triggered by the microstrip structure (7) and extend longitudinally on the sensor (4). The microstrip structure (7) ensures that the signal is transmitted over the sensor (4), thus stimulating the metamaterial cells (12) thanks to the ports (6) located at both ends thereof (FIG. 5).

In an embodiment of the invention, the thickness measurement system (1) comprises the sensor (4) covered with the layer (3), for which the inductive and capacitive values change when approached to the body (2) with a distance predetermined by the manufacturer, thereby decreasing the amplitude of the signal transmitted between the first port (601) and the second port (602), wherein due to the decrease in amplitude, the frequency value at which the signal energy (E) is minimum increases in proportion to the increase in layer (3) thickness. Thanks to the interaction of the metamaterial cells (12) with the body (2) and/or the layer (3) when the distance between the sensor (4) and the surface to be measured reaches the value predetermined by the user, the frequency at which the minimum value of the signal energy (E) transmitted between the first port (601) and the second port (602) is obtained, varies. Depending on the change in the frequency value, the layer (3) thickness value can be determined.

In an embodiment of the invention, the thickness measurement system (1) comprises the processor unit (5) which uses the S21 scattering parameter between the first port (601) and the second port (602) to detect the resonance frequency value at which the amplitude value of the signal transmitted over the sensor (4) is minimum. In this way, the signal transmitted between the ports (6) is graphically displayed and the frequency value with the highest change in signal energy (E) within the determined response frequency ranges (TF) can be determined.

In an embodiment of the invention, the thickness measurement system (1) comprises the processor unit (5) with an artificial neural network algorithm performing a machine learning process using measurement frequency (10) values for predetermined materials for the body (2) and layer (3) by means of supervised learning mechanisms, thereby detecting the relationship between the frequency value measured by the sensor (4) and the layer (3) thickness value, so as to be optimized for different types of materials for the body (2) and layer (3), and for different layer (3) thicknesses. Thanks to the algorithm containing artificial intelligence, the processor unit (5) provides the determination of the relationship between the measurement frequency (10) value and the layer (3) thickness value. Therefore, it is ensured that the layer (3) thickness value can be calculated for the body (2) and layer (3) consisting of different materials, without performing a direct matching process with the data in the memory unit (11).

In an embodiment of the invention, the thickness measurement system (1) comprises an input unit (13) that allows the user to select a material of the body (2) and layer (3); an output unit (14) that enables the layer (3) thickness value to be displayed to the user; the processor unit (5) which uses the measurement frequency (10) values stored in the memory unit (11) according to the material type selected through the input unit (13), so that the layer (3) thickness is detected and displayed to the user via the output unit (14). By means of the input unit (13), the user can determine material type of the body (2) and layer (3) by making a selection among the material types pre-stored in the memory unit (11). By means of the output unit (14), the desired parameters and measurement results are provided to the user.

In an embodiment of the invention, the thickness measurement system (1) comprises a distance measuring device (15) that enables measurement of the distance between the body (2) and the sensor (4); the processor unit (5) which provides an alert when the distance between the body (2) and the sensor (4) is different from the value predetermined by the user, and which enables the sensor (4) to be moved to decrease and/or increase the distance between the body (2) and the sensor (4), thus keeping the distance between the body (2) and the sensor (4) at a value predetermined by the user. By means of the distance measuring device (15), distance between the body (2) and the sensor (4) can be adjusted automatically to a predetermined distance value, so that the layer (3) thickness value can be measured precisely and accurately by the sensor (4). In case the predetermined distance between the layer (3) and the sensor (4) cannot be achieved, an alert is provided to the user by the processor unit (5) via the output unit (14).

In an embodiment of the invention, the thickness measurement system (1) comprises a plurality of metamaterial cells (12) periodically placed on the sensor (4). The metamaterial cells (12), which are conjugated with each other, extend along the sensor (4) so as to be between the microstrip structure (7) and the body (2). Thus, the layer (3) thickness measurement can be carried out precisely.

In an embodiment of the invention, the thickness measurement system (1) comprises the metamaterial cell (12), the dimensions of which can be changed to change the operating frequency value, so that the measurement sensitivity thereof can be adjusted. By changing the measurement sensitivity, the thickness measurement system (1) can be made suitable for different materials of body (2) and layer (3).

The invention claimed is:
1. A thickness measurement system (1) comprising:
a sensor (4) for measuring a thickness of a layer (3) coated on a body (2) by transmitting and/or reflecting electromagnetic signals, wherein the layer (3) improves physical properties of for the body (2) and/or provides protection against external factors for the body (2);
a processor unit (5) that receives and processes frequency data received from the sensor (4) to calculate a value of the thickness of the layer (3), wherein the sensor (4) comprises a metamaterial-based split-ring structure positioned a predetermined distance to the body (2); and
a plurality of ports (6) on the sensor (4) that allow frequency signal transfer therebetween;
wherein the processor unit (5) determines a frequency value at which a signal energy (E) transmitted between the ports (6) is minimum based on the frequency data received from the sensor (4), and matches the determined frequency value with a corresponding predetermined layer (3) thickness value so that the thickness of the layer (3) thickness value on the body (2) is determined in a contactless manner.

2. The thickness measurement system (1) according to claim 1, comprising:
a microstrip structure (7) on the sensor (4) for providing frequency signal transfer between the plurality of ports (6);

a first port (601) among the plurality of ports (6) that allows a frequency signal to be sent on the microstrip structure (7);

a second port (602) among the plurality of ports (6) for receiving the frequency signal sent from the first port (601) and transmitted over the microstrip structure (7); and wherein the processor unit (5) is connected with the first port (601) and the second port (602) and which matches the predetermined layer (3) thickness values with the frequency value at which the signal energy (E) change transmitted between the ports (6) is maximum, thereby enabling the layer (3) thickness to be determined simultaneously.

3. The thickness measurement system (1) according to claim 2, comprising a plurality of metamaterial cells (12) in a split-ring resonator structure between the microstrip structure (7) and the body (2), which are triggered by the microstrip structure (7) and extend longitudinally on the sensor (4).

4. The thickness measurement system (1) according to claim 2, wherein the processor unit (5) uses an S21 scattering parameter between the first port (601) and the second port (602) to detect the resonance frequency value at which the amplitude value of the signal transmitted over the sensor (4) is minimum.

5. The thickness measurement system (1) according to claim 3, wherein the plurality of metamaterial cells (12) are periodically placed on the sensor (4).

6. The thickness measurement system (1) according to claim 3, wherein at least one of the plurality of the metamaterial cells (12) has dimensions which, when changed, cause a change a value of the frequency signal sent on the microstrip structure (7) by the first port (601), so that measurement sensitivity of the thickness measurement system (1) is adjusted.

7. The thickness measurement system (1) according to claim 1, comprising a coating device (8) for applying the layer (3) on the body (2); wherein the sensor (4) is positioned on the coating device (8) so that a thickness of the layer (3) applied on the body (2) is measured simultaneously with a coating process by the coating device (8).

8. The thickness measurement system (1) according to claim 1, wherein a plurality of response frequency ranges (TF) vary according to a type of material from which each body (2) and each layer (3) is manufactured, and which include frequency values predetermined for different material types; and wherein the processor unit (5) allows the selection of the response frequency range (TF) of sensor (4) according to the material type.

9. The thickness measurement system (1) according to claim 8, wherein a plurality of measurement frequencies (10) within the response frequency range (TF) corresponding to the layer (3) thickness values are predetermined; comprising a memory unit (11) in which the measurement frequency (10) values are stored; and wherein the processor unit (5) comprises an algorithm for the calculation of the layer (3) thickness by matching the frequency value detected by the sensor (4) with the measurement frequency (10) values in the memory unit (11).

10. The thickness measurement system (1) according to claim 9, wherein the processor unit (5) is configured to calculate the layer (3) thickness by performing an interpolation process between certain of the layer (3) thickness values when the frequency value detected by the sensor (4) does not exactly match any of the layer (3) thickness values stored in the memory unit (11).

11. The thickness measurement system (1) according to claim 9, comprising:

an input unit (13) that allows a user to select a material of the body (2) and layer (3);

an output unit (14) that enables the layer (3) thickness value to be displayed to the user; and wherein the processor unit (5) uses the measurement frequency (10) values stored in the memory unit (11) according to the material type selected through the input unit (13), so that the layer (3) thickness is detected and displayed to the user via the output unit (14).

12. The thickness measurement system (1) according to claim 1, comprising a distance measuring device (15) for measuring a distance between the body (2) and the sensor (4); and wherein the processor unit (5) provides an alert when the measured distance between the body (2) and the sensor (4) is different from a predetermined value.

* * * * *